(12) United States Patent
Sugita et al.

(10) Patent No.: US 11,079,774 B2
(45) Date of Patent: Aug. 3, 2021

(54) FLOW RATE CONTROL DEVICE

(71) Applicant: FUJIKIN INCORPORATED, Osaka (JP)

(72) Inventors: Katsuyuki Sugita, Osaka (JP); Ryousuke Dohi, Osaka (JP); Kaoru Hirata, Osaka (JP); Koji Kawada, Osaka (JP); Nobukazu Ikeda, Osaka (JP); Kouji Nishino, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 16/760,726

(22) PCT Filed: Nov. 20, 2018

(86) PCT No.: PCT/JP2018/042795
§ 371 (c)(1),
(2) Date: Apr. 30, 2020

(87) PCT Pub. No.: WO2019/107215
PCT Pub. Date: Jun. 6, 2019

(65) Prior Publication Data
US 2020/0348704 A1    Nov. 5, 2020

(30) Foreign Application Priority Data

Nov. 30, 2017 (JP) .............................. JP2017-230538

(51) Int. Cl.
*F16K 31/02* (2006.01)
*G05D 7/06* (2006.01)
(Continued)

(52) U.S. Cl.
CPC ............ *G05D 7/0647* (2013.01); *F15C 1/003* (2013.01); *G05D 16/024* (2019.01);
(Continued)

(58) Field of Classification Search
CPC ............ G05D 7/0647; G05D 16/0402; G05D 16/024; G05D 16/028; G05D 16/20; F15C 1/003
(Continued)

(56) References Cited

U.S. PATENT DOCUMENTS 6,170,526 B1 * 1/2001 O'Neill ................. F16K 31/007
137/625.65
7,654,137 B2 * 2/2010 Hirata .................... G01F 1/6845
73/204.18
(Continued)

FOREIGN PATENT DOCUMENTS

JP    2004-138425 A    5/2004
JP    2004-157719 A    6/2004
(Continued)

OTHER PUBLICATIONS

International Search Report issued in PCT/JP2018/042795; dated Feb. 5, 2018.

*Primary Examiner* — Minh Q Le
(74) *Attorney, Agent, or Firm* — Studebaker & Brackett PC

(57) ABSTRACT

A flow rate control device (100) comprises: a pressure control valve (6) provided in a flow path; a flow rate control valve (8) provided downstream side of the pressure control valve; and a first pressure sensor (3) for measuring pressure on the downstream side of the pressure control valve and on the upstream side of the flow rate control valve. The flow rate control valve has a valve element (13) seated on/separated from a valve seat (12); a piezoelectric element (10*b*) for moving the valve element so as be seated on/separated from the valve seat; and a strain sensor (20) provided on a side surface of the piezoelectric element. The pressure control valve (6) is configured to control the pressure control valve (6) on the basis of a signal output from the first (Continued)

pressure sensor (3), and to control the driving of the piezoelectric element of the flow rate control valve (8) based on a signal output from the strain sensor (20).

12 Claims, 9 Drawing Sheets

(51) Int. Cl.
*G05D 16/00* (2006.01)
*G05D 16/04* (2006.01)
*G05D 16/20* (2006.01)
*F15C 1/00* (2006.01)

(52) U.S. Cl.
CPC ....... *G05D 16/028* (2019.01); *G05D 16/0402* (2019.01); *G05D 16/20* (2013.01)

(58) Field of Classification Search
USPC ... 137/505.25, 487.5, 599.01, 599.07, 625.3; 251/129.06, 129.08, 129.01; 156/345.15, 156/345.24, 345.26; 118/715
See application file for complete search history.

(56) References Cited

U.S. PATENT DOCUMENTS

| | | | | |
|---|---|---|---|---|
| 8,944,095 | B2* | 2/2015 | Okabe | C23C 16/00 137/486 |
| 9,383,758 | B2* | 7/2016 | Ohmi | G05D 7/0641 |
| 10,054,959 | B2* | 8/2018 | Somani | G01F 1/34 |
| 10,665,430 | B2* | 5/2020 | Sawachi | H01J 37/3244 |
| 2001/0038083 | A1* | 11/2001 | Sakurai | F16K 31/007 251/129.06 |
| 2004/0204794 | A1* | 10/2004 | Ohmi | G05D 7/0635 700/282 |
| 2010/0127196 | A1 | 5/2010 | Sawada et al. | |
| 2010/0139775 | A1* | 6/2010 | Ohmi | G01F 7/005 137/12 |
| 2011/0042595 | A1 | 2/2011 | Matsumoto et al. | |
| 2012/0273061 | A1* | 11/2012 | Hidaka | F16K 31/007 137/334 |
| 2012/0298220 | A1* | 11/2012 | Hidaka | G05D 7/0635 137/468 |
| 2016/0239026 | A1* | 8/2016 | Nagase | G01F 15/04 |
| 2018/0283914 | A1* | 10/2018 | Sugita | G01F 1/00 |
| 2019/0129452 | A1* | 5/2019 | Hirata | G05B 19/042 |
| 2019/0243391 | A1* | 8/2019 | Hirata | G05D 7/0652 |
| 2019/0243392 | A1* | 8/2019 | Ding | G01F 15/005 |
| 2020/0018413 | A1* | 1/2020 | Dohi | G05D 7/06 |
| 2020/0033895 | A1* | 1/2020 | Sugita | G01F 15/005 |
| 2020/0033896 | A1* | 1/2020 | Tseng | G05D 7/0647 |
| 2020/0199753 | A1* | 6/2020 | Hidaka | C23C 16/4485 |
| 2020/0348158 | A1* | 11/2020 | Sugita | G05D 7/0635 |

FOREIGN PATENT DOCUMENTS

| | | |
|---|---|---|
| JP | 2007-192269 A | 8/2007 |
| JP | 4933936 B2 | 5/2012 |
| KR | 10-2014-0116534 A | 10/2014 |
| KR | 10-2016-0043060 A | 4/2016 |

\* cited by examiner (a)

(b)

(a)

(b)

FLOW RATE CONTROL DEVICE

TECHNICAL FIELD

The present invention relates to a flow rate control device, and more particularly, to a flow rate control device suitably used in a semiconductor manufacturing facility, a chemical manufacturing facility, or the like.

BACKGROUND OF INVENTION

In semiconductor manufacturing equipment and chemical plants, in order to control the flow of fluid such as material gas and etching gas, various types of flow meters and flow rate control devices are utilized. Among these, pressure-type flow rate control device is widely used because of its ability to control the flow rate of various fluids with high accuracy by a relatively simple mechanism of combining a control valve and a restriction part, e.g., an orifice plate (e.g., Patent Document 1).

As the control valve of the pressure type flow rate control device, a metal diaphragm valve is often used in terms of high corrosion resistance, low dust generation, good substitutability of gas, and quick and reliable opening and closing of the fluid passage at the time of opening and closing the valve. In addition, as a driving device for opening and closing the metal diaphragm, a piezoelectric element driven device (also referred to as a piezo actuator) is widely utilized.

In Patent Document 2, the piezoelectric element driven valve configured to open and close the metal diaphragm valve element using the piezoelectric element as described above (also referred to as a piezo element) is disclosed. In the piezoelectric element driven valve, the extension degree of the piezoelectric element varies depending on the driving voltage applied to the piezoelectric element, the pressing pressure for pressing the metal diaphragm valve element to the valve seat is changed with this. When the metal diaphragm valve element is pressed against the valve seat with sufficient pressing force, the valve is closed. When the pressing force is weakened, the metal diaphragm valve element is away from the valve seat to open the valve. The piezoelectric element driven valve has the advantages of high-speed operation and relatively small hysteresis in operating characteristics.

Further, the piezoelectric element driven type valve has a normally open type and a normally close type, in the normally open type, the valve element moves in the closing direction in conjunction with the extension of the piezoelectric element by an applied voltage. On the other hand, in the normally close type, the valve element moves in the opening direction in conjunction with the extension of the piezoelectric element. The normally open type of the piezoelectric element driven valve is disclosed in Patent Document 3, for example.

PRIOR-ART DOCUMENT

Patent Literature

Patent Document 1: Japanese Laid-Open Patent Publication No. 2004-138425
Patent Document 2: Japanese Laid-Open Patent Publication No. 2007-192269
Patent Document 3: Japanese Patent No. 4933936

SUMMARY OF INVENTION

Problems to be Solved by Invention

In the conventional semiconductor process control, because the piezoelectric element driven valve is controlled so as to eliminate the difference with respect to a set flow rate, relatively gentle opening and closing operation with an analogically slight amount of displacement is often performed.

However, in recent years, the flow rate control device is demanded for application to ALD (Atomic Layer Deposition) or the like, in such applications, high speed or very short period flow switching by opening and closing the control valve according to a pulse control signal is required. In this case, as in the conventional pressure type flow rate control device, by the flow rate control method of controlling the pressure upstream of the restriction part using a control valve, sufficient flow rate rise-up/fall-down characteristics cannot be obtained, and it was difficult to apply to the pulse flow control.

Further, in order to appropriately perform the pulsed flow rate control, it is also conceivable to configure the flow rate control device using a solenoid valve or the like having excellent responsiveness. However, in this case, the manufacturing cost of the device is increased, the advantage of the pressure-type flow rate control device being able to control the flow rate with high accuracy by a relatively simple mechanism may be impaired. Therefore, in the conventional flow rate control device, there is a problem to appropriately perform both the pulsed flow rate control and the flow rate control of the continuous flow in compatibility.

The present invention has been made to solve the above-mentioned problems, and a main object thereof is to provide a flow rate control device having good responsiveness, and capable of coping with pulse flow rate control or the like, while following the characteristics of a conventional pressure type flow rate control device.

Means for Solving Problem

A flow rate control device according to an embodiment of the present invention includes a pressure control valve provided in a flow path, a flow rate control valve provided downstream side of the pressure control valve, a first pressure sensor for measuring pressure of the downstream side of the pressure control valve and pressure of an upstream side of the flow rate control valve, and a restriction part having a fixed opening degree, wherein the flow rate control valve has a valve element that is seated on/separated from a valve seat, a piezoelectric element for moving the valve element so as to be seated on/separated from the valve seat, and a strain sensor that is installed on a side surface of the piezoelectric element, considering a distance between the valve seat and the valve element of the flow rate control valve as an opening, the flow rate control valve is used as a restriction part capable of changing the opening, while controlling the pressure control valve on the basis of a signal output from the first pressure sensor, controls the drive of the piezoelectric element on the basis of a signal output from the strain sensor, when performing continuous flow control, performs flow rate control using the restriction part having a fixed opening degree, when performing intermittent flow control, performs flow rate control using the flow rate control valve that serves as the restriction part capable of changing the opening.

In one embodiment, when performing the continuous flow control using the restriction part having a fixed opening degree, the fluid control valve is fully opened.

In one embodiment, the restriction part having a fixed opening degree is provided upstream side of the flow rate control valve.

In one embodiment, the flow rate control device further comprises a second pressure sensor for measuring a pressure downstream of the flow rate control valve.

In one embodiment, the restriction part having a fixed opening degree is provided downstream side of the flow rate control valve.

In one embodiment, the flow rate control device further comprises a second pressure sensor for measuring a pressure downstream of the restriction part having a fixed opening degree.

In one embodiment, the flow control device further comprises a third pressure sensor for measuring a pressure between the flow rate control valve and the restriction part having a fixed opening degree.

In one embodiment, the maximum set flow rate of the restriction part having a fixed opening degree is greater than the maximum set flow rate of the flow rate control valve.

In one embodiment, the flow rate control is performed in a state where the pressure upstream of the flow rate control valve and the pressure downstream of the flow rate control valve satisfies the critical expansion condition.

In one embodiment, the strain sensor includes a first strain gauge for detecting strain in the stretching direction of the piezoelectric element, and a second strain gauge for detecting strain in a direction orthogonal to the stretching direction of the piezoelectric element.

In one embodiment, the flow rate control valve comprises a piezo actuator having a plurality of piezoelectric elements, including the piezoelectric element whereto the strain sensor is attached, and a cylindrical body for accommodating the plurality of piezoelectric elements in a row, and is a normally open type valve configured to move a metal diaphragm valve element, that is served as the valve element, in the direction of the valve seat, by applying a voltage to the piezo actuator.

In one embodiment, the flow rate control valve comprises a piezo actuator having the piezoelectric element whereto the strain sensor is attached, and a cylindrical body for accommodating the piezoelectric element, and is a normally open type valve configured to move the metal diaphragm valve element, that is served as the valve element, in the direction of the valve seat, by applying a voltage to the piezo actuator.

Effect of Invention

According to the embodiments of the present invention, a flow rate control device having good responsiveness is provided.

DETAILED DESCRIPTION OF INVENTION

Embodiments of the present invention will be described below with reference to the drawings, but the present invention is not limited to the following embodiments.

Figure 1:
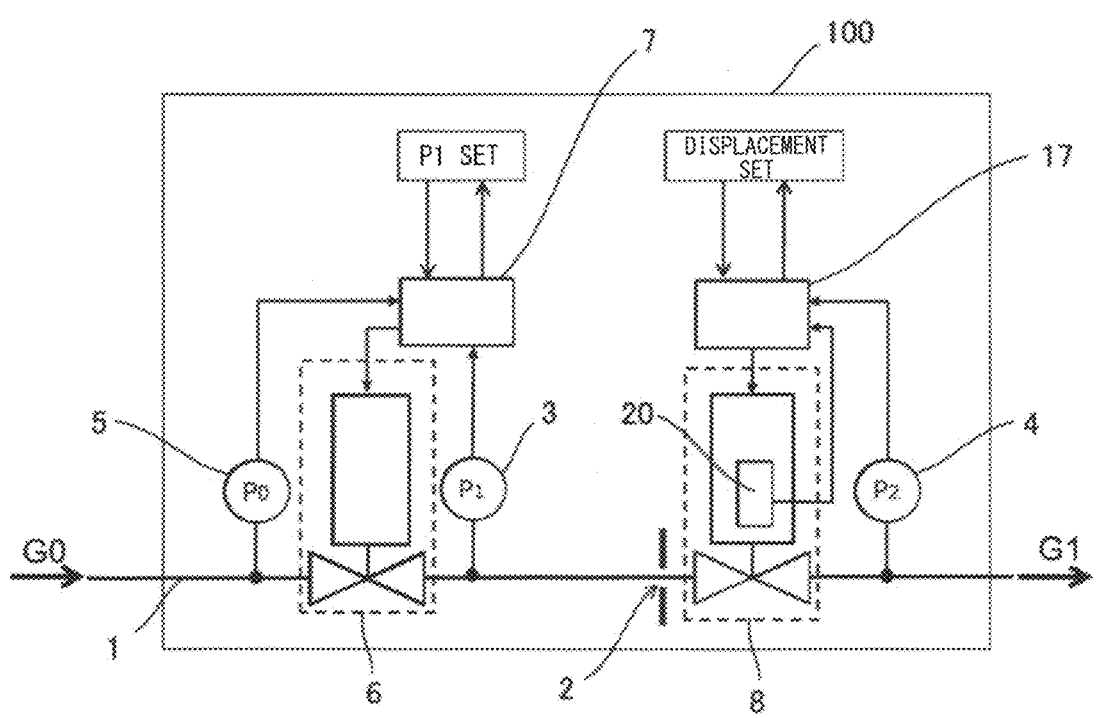
FIG. 1 is a schematic diagram showing a configuration of a flow rate control device according to an embodiment of the present invention.

FIG. 1 shows a configuration of a flow rate control device 100 according to an embodiment of the present invention. The flow rate control device 100 comprises: a pressure control valve 6 provided on an inlet side of a flow path 1 of a gas G0, a flow rate control valve 8 provided downstream side of the pressure control valve 6, a first (or upstream) pressure sensor 3 for detecting a pressure $P_1$ that is a pressure downstream of the pressure control valve 6 and upstream of the flow rate control valve 8, and a restriction part 2 disposed downstream side of the pressure control valve 6.

In the present embodiment, the restriction part 2 is constituted by an orifice plate disposed on the upstream side of the flow control valve 8. Since the area of the orifice is fixed, the orifice plate functions as a restriction part having a fixed opening degree. In the present embodiment, the restriction part 2 is a portion where the cross-sectional area of the flow path is limited smaller than the flow path cross-sectional area of the front and back. For example, the restriction part 2 is configured by an orifice plate or a critical nozzle and can be configured by using a sonic nozzle or other things. Further, in the specification of the present application, the restriction part includes a valve structure in which the distance between the valve seat and the valve element of the valve is a degree of opening, and the degree of opening is simulated to a virtual variable orifice. Such a valve structure functions as a restriction part having a variable opening.

The Flow rate control device 100 of the present embodiment also comprises a second (or downstream) pressure sensor 4 for measuring a pressure $P_2$ downstream side of the flow rate control valve 8, and an inflow pressure sensor 5 for detecting a pressure $P_0$ upstream side of the pressure control valve 6. However, the flow rate control device 100 may not include the second pressure sensor 4 or the inflow pressure sensor 5 in other embodiments.

The first pressure sensor 3 can measure the upstream pressure $P_1$ that is the fluid pressure between the pressure control valve 6 and the restriction part 2 or the flow rate control valve 8; the second pressure sensor 4 can measure the downstream pressure $P_2$ of the restriction part 2 or the flow rate control valve 8. Further, the inflow pressure sensor 5 can measure the inflow pressure $P_0$ of the material gas such as an etching gas or a carrier gas that is supplied to the flow rate control device 100 from a connected gas supply device (e.g., a raw material vaporizer or a gas supply source). The inflow pressure $P_0$ can be used to control the amount and the pressure of the gas supplied from the gas supply device.

The downstream side of the flow rate control valve 8 is connected to a process chamber of the semiconductor manufacturing apparatus via a downstream valve (not shown). A vacuum pump is connected to the process chamber, and typically, a gas G1 with controlled flow rate is supplied from the flow rate control device 100 to the process chamber in a state where the inside of the process chamber is evacuated. As the downstream valve, for example, a known Air Operated Valve whose opening and closing operation is controlled by compressed air, or a solenoid valve or the like may be used.

The flow path 1 of the flow rate control device 100 may be constituted by a pipe, or may be constituted by a channel hole formed in a metal block. The first and second pressure sensors 3 and 4 may include, for example, a silicon single crystal sensor chip and a diaphragm.

Further, the pressure control valve 6 may be, for example, a known piezoelectric element driven valve for driving a metal diaphragm valve element with a piezo actuator. As described later, the opening of the pressure control valve 6 is controlled in response to a signal output from the first pressure sensor 3. The upstream pressure $P_1$ output by the first pressure sensor 3 is feedback controlled so as to be maintained at the input set value.

Further, in the present embodiment, the flow rate control valve 8 is a piezoelectric element driven valve having a valve element disposed so as to contact to and separate from a valve seat (hereinafter, sometimes referred to as detachable seating), a piezoelectric element for moving the valve element, a strain sensor for detecting the extension amount of the piezoelectric element (also referred to as strain gauge) 20. As described later, the flow rate control valve 8 is configured so that the drive of the piezoelectric element can be feedback controlled on the basis of the signal output from the strain sensor 20.

Figure 2:
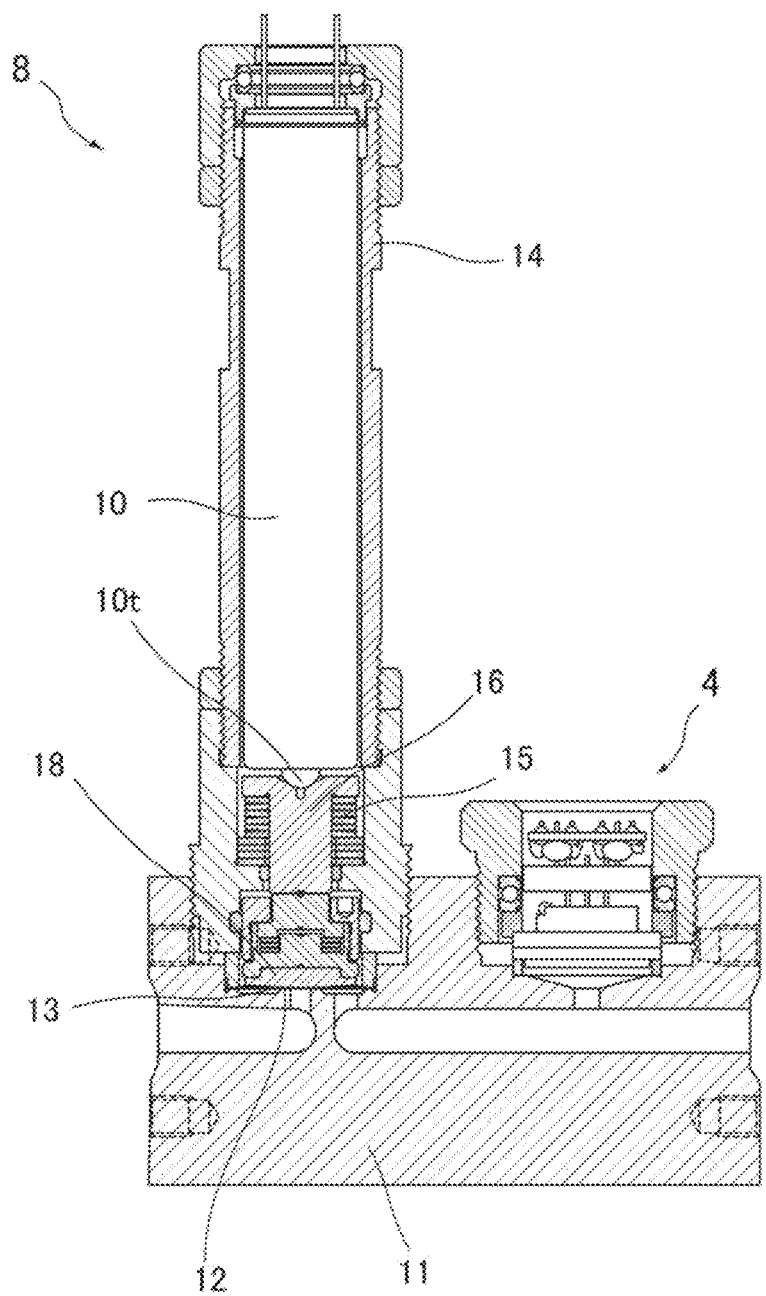
FIG. 2 is a cross-sectional view showing a flow rate control valve and a second pressure sensor used in an embodiment of the present invention.

FIG. 2 shows an example of a configuration of a flow rate control valve 8 shown in FIG. 1 and a second pressure sensor 4 provided downstream side thereof. The flow rate control valve 8 and the second pressure sensor 4 are attached to a main body block 11. In addition, an inlet side of the main body block 11 is connected to another main body block attached with the pressure control valve 6 and the first pressure sensor 3 shown in FIG. 1 (not shown). Further, the restriction part 2 shown in FIG. 1 is fixed in the connection portion between the main body block 11 and the other main body block, for example, as an orifice plate via a gasket. However, as the restriction part, in addition to the orifice member such as an orifice plate, a critical nozzle or a sonic nozzle can also be used. The aperture diameter of the orifice or the nozzle is set to, for example, 100 µm to 500 µm.

The flow rate control valve 8 shown in FIG. 2 is a normally open type valve and is configured so as the valve element to move in the valve seat direction by the extension of a piezo actuator 10. The flow control valve 8 comprises the piezo actuator 10 including one or a plurality of piezoelectric elements 10b (see FIG. 3), a metal diaphragm valve element 13 disposed under the piezo actuator 10, and a guide cylinder 14 provided on the outside of the piezo actuator 10.

A lower end 10t of the piezo actuator 10 is supported by a support 16 and a valve element holding 18 in contact with the diaphragm valve element 13 is provided under the support 16. The metal diaphragm valve element 13 is an own elastic return type, for example, formed by a thin plate made of nickel chromium alloy steel or the like.

The metal diaphragm valve element 13 is positioned so as to be detachable from the valve seat 12 provided in the flow path of the main body block 11. Although the metal diaphragm valve element 13 of the present embodiment is formed in a reverse dish shape with the central portion slightly swollen upward, the shape of the metal diaphragm valve element 13 may be a flat plate, also the material may be stainless steel or Inconel alloy or other alloy steel. The metal diaphragm valve element 13 may be made of one metal diaphragm or may be made of two or three stacked multiple metal diaphragms.

In the above configuration, in a state where driving voltage is not applied to the piezo actuator 10, the metal diaphragm valve element 13 (central portion) is separated from the valve seat 12 by a self-elastic force. Further, in the present embodiment, an elastic member 15 disposed around the support 16 (here pan spring) supports the support 16 and the piezo actuator 10, the metal diaphragm valve element 13 is easy to be separated from the valve seat 12 when no voltage is applied. The elastic member 15 is also used to keep the piezo actuator 10 compressed in advance.

On the other hand, when driving voltage is applied to the piezo actuator 10, on the inside of the guide cylinder 14 fixed with respect to the valve element 11, the piezo actuator 10 extends downward. Then, the lower end 10t of the piezo actuator 10 pushes down the support 16 against the biasing force of the elastic member 15, the valve element holding 18 in conjunction with this moves the metal diaphragm valve element 13 in the direction to the valve seat 12. Thus, the valve opening is reduced and finally the valve is closed.

Such a normally open type valve is in the closed valve state when the maximum driving voltage is applied to the piezo actuator 10 and the opening can be arbitrarily adjusted by reducing the driving voltage. Further, the normally open type valve is connected by a mechanism with relatively little looseness from the piezo actuator 10 to the valve element holding 18, the extension of the piezo actuator 10 at the time of voltage application start is hardly hindered. Therefore, it is easy to move the valve element 13 from the moment when the voltage is applied to the piezo actuator 10, and the responsiveness is improved.

Figure 3:
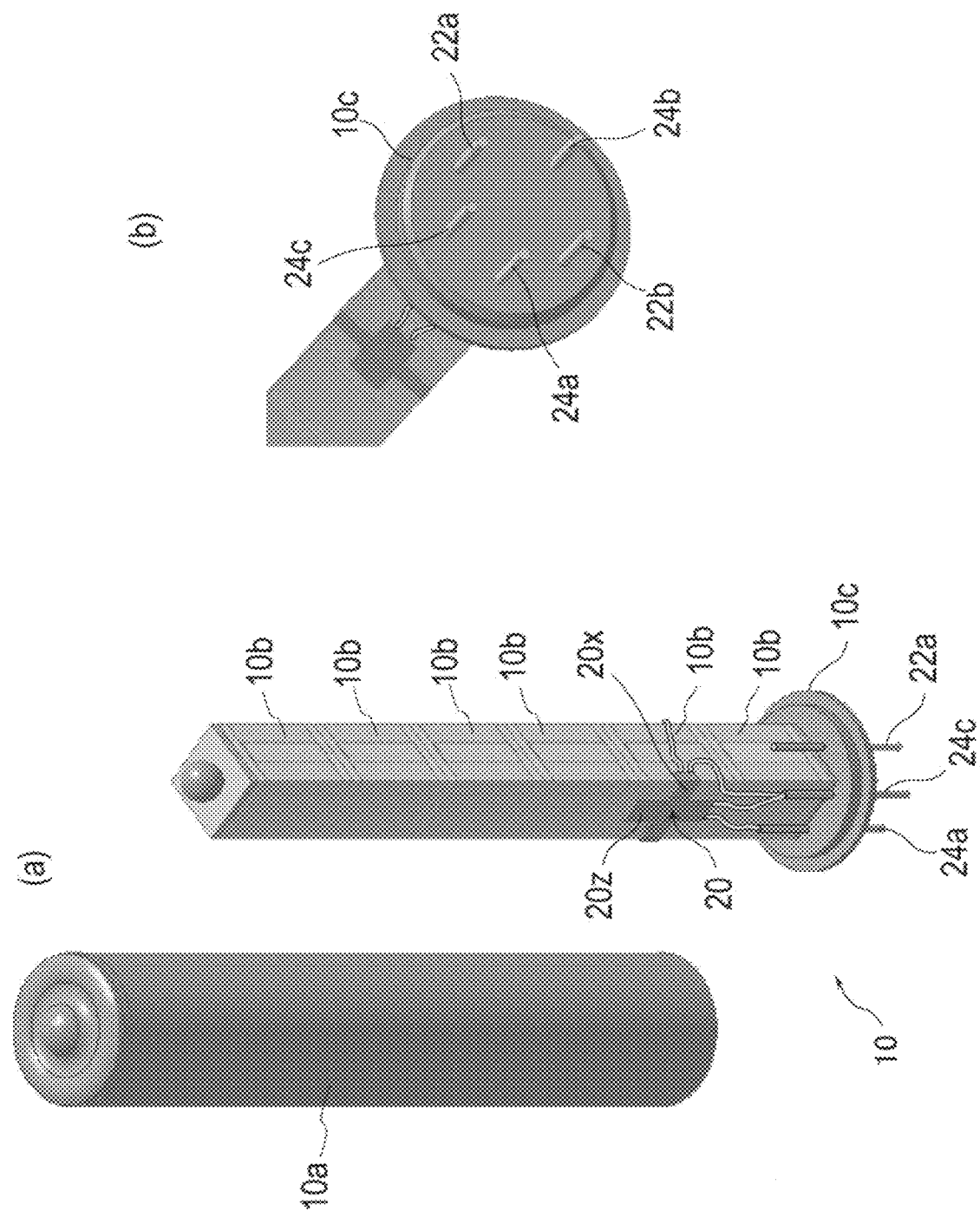
FIG. 3 is a diagram showing a piezo actuator used in an embodiment of the present invention, (a) shows a piezo stack housed in a cylindrical body and the interior, (b) shows the connector portion.

Next, a detailed configuration of the piezo actuator 10 constituting the flow control valve 8 will be described. FIG. 3 (a) shows a disassembling of an outer cylindrical body 10a, a plurality of piezoelectric elements 10b accommodated in a row in the cylindrical body 10a (hereinafter, sometimes referred to as piezo stack 10b), FIG. 3 (b) shows a state of viewing a connection part 10c shown in FIG. 3 (a) from the front direction. In FIG. 3 (a), the piezo actuator 10 is shown in the upside down direction from FIG. 2.

As shown in FIG. 3(a), in the piezoelectric actuator 10, the strain sensor 20 is directly attached to one of the plurality of piezoelectric elements 10b by an adhesive or the like. The strain sensor 20 is disposed on a side surface of the piezoelectric element, in the present embodiment, it comprises a first strain gauge 20z for detecting the strain in the z direction, which is the main extension direction of the piezo stack, i.e., the stacking direction of the piezoelectric element; and a second strain gauge 20x for detecting the strain in the x direction, which is perpendicular to the main extension direction. As the first strain gauge 20z and the second strain gauge 20x, a KFR-02N, a KFGS-1, KFGS-3, or the like manufactured by Kyowa Denko Corporation can be used.

In the present embodiment, the whole first strain gauge 20z is pasted in contact with the piezoelectric element, the second strain gauge 20x is attached to the piezoelectric element so as to intersect across the central portion of the first strain gauge 20z. The first strain gauge 20z and the second strain gauge 20x can detect the displacement of the piezoelectric element as a change in the electrical resistance of the first strain gauge 20z and the second strain gauge 20x.

Further, as shown in FIG. 3 (b), the connector portion 10c is provided with a pair of drive voltage terminals 22a and 22b for applying drive voltage to the piezo stack 10b, a first strain sensor output terminal 24a connected to one terminal of the first strain gauge 20z, a strain sensor common output terminal 24c connected in common to the other terminal of the first strain gauge 20z and one terminal of the second strain gauge 20x, and a second strain sensor output terminal 24b connected to the other terminal of the second strain gauge 20x.

A plurality of piezoelectric elements 10b constituting the piezo stack 10b are electrically connected to the drive voltage terminals 22a and 22b by a known circuit configuration. By applying a voltage to the drive voltage terminals 22a and 22b, all of the plurality of piezoelectric elements 10b can be extended in the stack direction. The displacement of the piezo stack can be controlled by the magnitude of the applied voltage. As the piezo actuator 10, for example, products from the NTK CERATEC, etc. can be utilized. In addition, in other embodiments, the piezo actuator 10 may be constituted by a single piezoelectric element accommodated in the cylindrical body and a strain sensor attached thereto on the side surface.

The first and second strain sensor output terminals 24a, 24b and the strain sensor common output terminal 24c is connected to a circuit provided on an external substrate to form a bridge circuit including the first strain gauge 20z and the second strain gauge 20x. In this bridge circuit, a change in the resistance value of the first strain gauge 20z and the second strain gauge 20x can be detected.

Figure 4:
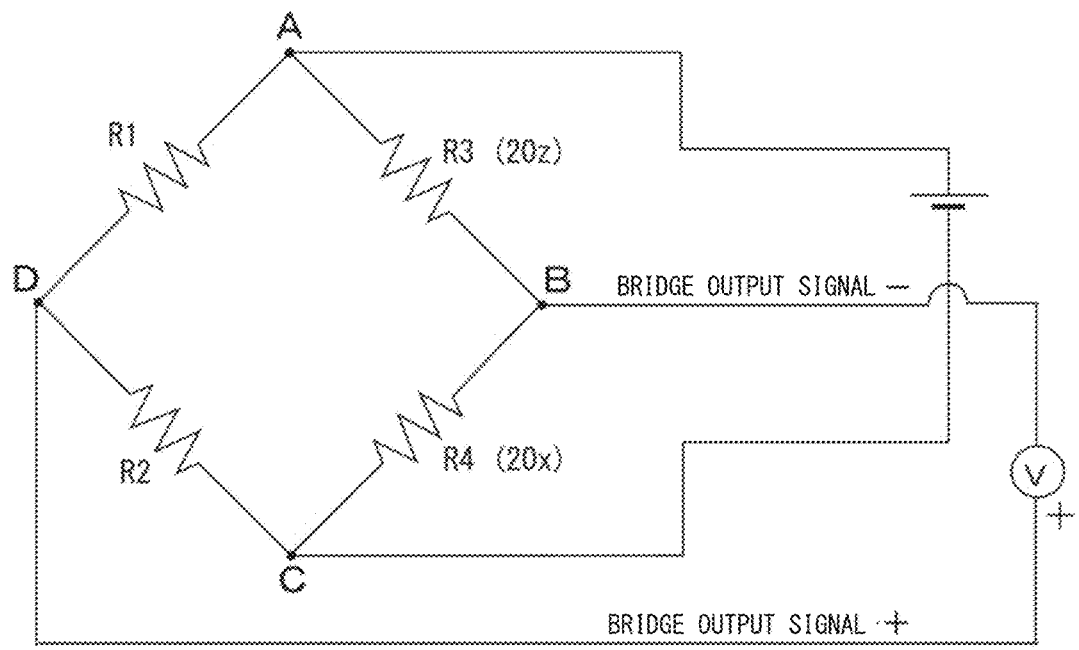
FIG. 4 illustrates an exemplary bridge circuit for obtaining an output from a strain sensor used in an embodiment of the present invention.

FIG. 4 shows an exemplary equivalent circuit for detecting the resistance value change of the first strain gauge 20z and the second strain gauge 20x. In the equivalent circuit shown in FIG. 4, the resistors R1 and R2 provided between the branch point A-D and the branch point C-D corresponds to the fixed resistance of the known resistance value provided on the external substrate, the resistance R3 provided between the branch point A-B corresponds to the first strain gauge 20z, the resistance R4 provided between the branch point B-C corresponds to the second strain gauge 20x. In the present embodiment, the resistance values of the first strain gauge 20z and the second strain gauge 20x are set the same as the resistance values of the two fixed resistors R1 and R2, for example, both are set to 120 ohms or 350 ohms.

Further, in FIG. 4, the branch point A corresponds to the first strain sensor output terminal 24a, the branch point B corresponds to the strain sensor common output terminal 24c, and the branch point C corresponds to the secondary strain sensor output terminal 24b. In this equivalent circuit, in a state where a predetermined bridge applied voltage is applied between the branch point A-C, the change in the resistance value of the first strain gauge 20z or the second strain gauge 20x is detected as a change in the bridge output signal (electric potential difference between the branch point B-D). When the magnitudes of the resistors R1 to R4 are the same as described above, the bridge output signal typically exhibits zero in the initial state where the first and second strain gauges 20z and 20x are not stressed.

When a driving voltage is applied to the piezo stack, the piezoelectric element with the strain sensor 20 attached extends in the z direction, but shrinks in the x direction orthogonal thereto. In this case, the resistance value of the first strain gauge 20z increases corresponding to the extension amount of the piezoelectric element, the resistance value of the second strain gauge 20x decreases corresponding to the contraction amount of the piezoelectric element.

Then, in the circuit shown in FIG. 4, when the piezo stack 10b is extended by applied driving voltage, the bridge output signal increases with the increase of the distortion amount in the first strain gauge 20z, the bridge output signal also increases by the decrease of the distortion amount in the second strain gauge 20x. Therefore, at the time of the piezo stack displacement, variation in the bridge output signal occurs corresponding to the sum of the increased amount of distortion of the first strain gauge 20z, and the decreased amount of distortion of the second strain gauge 20x. Thus, the bridge output signal can be amplified.

Further, as described above, by configuring the bridge circuit using the first strain gauge 20z and the second strain gauge 20x orthogonal thereto, it is possible to correct the resistance value change of the strain gauge due to temperature changes. This is because, for example, when the piezoelectric element is expanded by temperature rise, the expansion acts as an element for the first strain gauge 20z to increase the bridge output signal to, but acts as an element for the second strain gauge 20x to decrease the bridge output signal, so that the bridge output signal with canceled increasing element and decreasing element due to temperature can be obtained. Therefore, even when the piezoelectric element itself expands and contracts due to temperature change, the influence on the bridge output signal is reduced, and temperature compensation can be realized.

Figure 5:
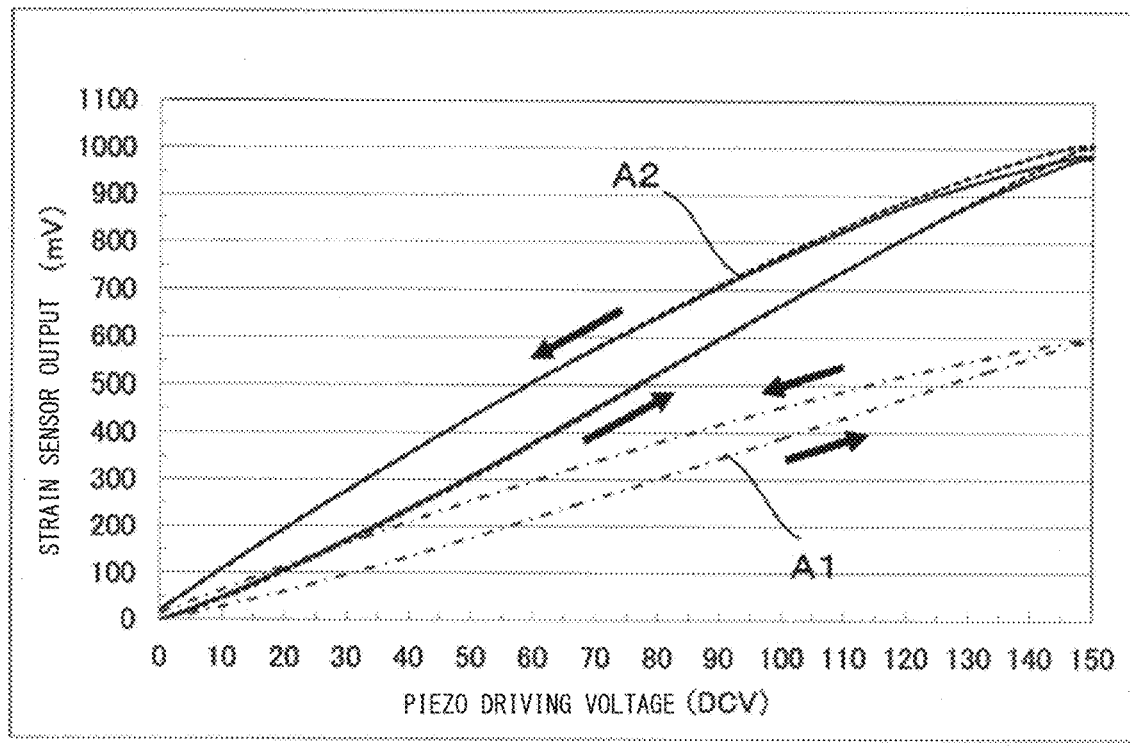
FIG. 5 is a graph showing the output of the strain sensor in the case of vertical 1 gauge and the case of orthogonal 2 gauge.

FIG. 5 shows a graph A1 indicating the relationship between the piezo drive voltage and the distortion sensor output (bridge output signal: amplifier gain×400) in the case of using only the first strain gauge 20z (vertical 1 gauge) (when constructing a bridge circuit as the equivalent circuit shown in FIG. 4, considering the resistance R4 provided between the branch point B-C as a known fixed resistance), and a graph A2 indicating the case of configuring the strain sensor using the said first strain gauge 20z and the second strain gauge 20x (orthogonal 2 gauge). As the graph A2, two examples of the configuration in the same manner of orthogonal two gauges are shown.

As can be seen by comparing the graph A1 and the graph A2, when applying the piezo driving voltage, in the case of using the orthogonal 2 gauge in the graph A2, an amplified strain sensor output can be obtained compared to the graph A1 in the case of the vertical 1 gauge.

Figure 6:
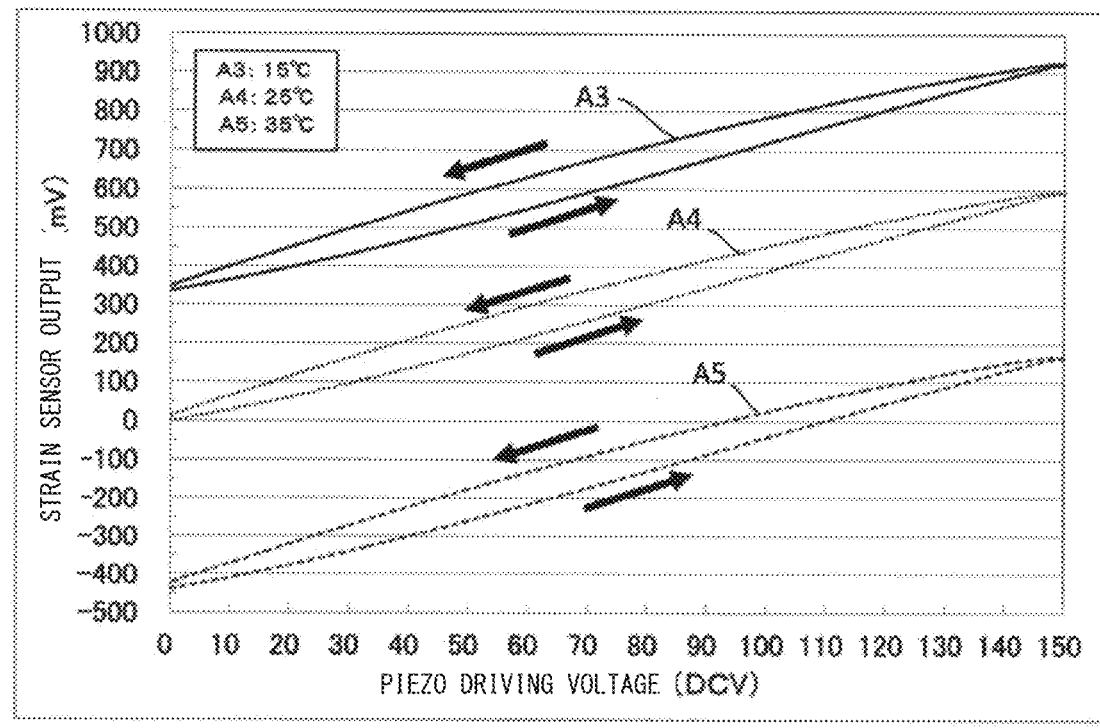
FIG. 6 is a graph showing the temperature dependence of the output of the strain sensor, in the case of vertical 1 gauge and the case of orthogonal 2 gauge, (a) shows the case of vertical 1 gauge, (b) shows the case of orthogonal 2 gauge.
Figure 6:
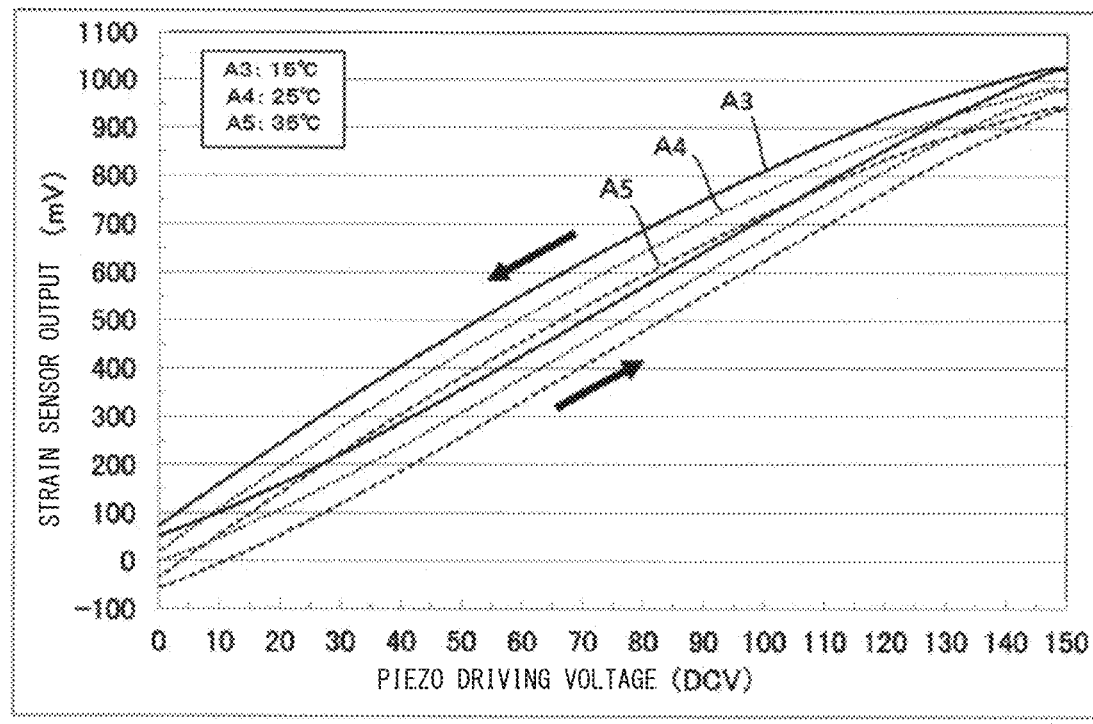

Further, FIG. 6 (a) shows the temperature dependence of the strain sensor output when using the vertical 1 gauge (graph A3, A4, A5 at 15° C., 25° C., 35° C.). FIG. 6 (b) shows the case of using the orthogonal 2 gauge. As can be seen by comparing FIG. 6(a) and FIG. 6(b), by using two orthogonal gauges, the graph A3 at 15° C., the graph A4 at 25° C., and the graph A5 at 35° C. become closer to each other, and the temperature dependence can be reduced. In order to perform the temperature compensation more accurately, the strain sensor output can be corrected to 0 when the piezo driving voltage (applied voltage to the piezoelectric element) is 0, zero-point correction may also be performed.

Further, as can be seen from FIGS. 5 and 6, the relationship between the piezo driving voltage and the strain sensor output is slightly different at the time of boosting and steping-down. This is considered to be because the strain sensor output corresponds to the actual opening of the valve, while the actual opening of the valve is different even when the magnitude of the driving voltage is the same at the time of boosting and steping-down of the piezo actuator. Thus, sometimes it is difficult to determine the actual opening of the valve only by referring to the driving voltage, if the feedback control of the valve opening based on the output of the strain sensor, it is possible to perform more accurately opening adjustment.

In addition, in the specification of the present application, the output of the strain sensor means various outputs corresponding to the resistance value of the strain gauge that varies according to the strain amount of the strain gauge constituting the strain sensor, for example, it may be the resistance value of the strain gauge itself, or the bridge output signal of the Wheatstone bridge circuit incorporating a plurality of strain gauges outputs (see FIG. 4), etc. The output of the strain sensor obtained in any aspect is corresponded to the extension amount of the piezoelectric element, therefore the extension amount of the piezoelectric element based on the output of the strain sensor can be known.

Hereinafter, with reference to FIG. 1 again, a flow control operation in the flow rate control device 100 will be described.

The flow rate control device 100 comprises a first control circuit 7 for controlling the opening and closing operation of the pressure control valve 6 on the basis of the output from the first pressure sensor 3. The first control circuit 7 is configured to feedback control the pressure control valve 6 so that the difference between the set upstream pressure received from outside and the output $P_1$ of the first pressure sensor 3 becomes zero. In this manner, it is possible to maintain the downstream side of the pressure control valve 6 and the pressure $P_1$ of the upstream side of the flow rate control valve 8 at the set values.

Further, the flow rate control device 100 receives the output from the strain sensor 20 provided in the flow rate control valve 8 as a piezo valve displacement, and has a second control circuit 17 for controlling the drive of the flow rate control valve 8 based on the output. In FIG. 1, although the first control circuit 7 and the second control circuit 17 are shown as embodiments provided separately, they may be provided integrally.

The first control circuit 7 and the second control circuit 17 may be incorporated in the flow rate control device 100 and may be provided outside of the flow rate control device 100. The first control circuit 7 and the second control circuit 17 are typically configured by CPUs, memories M such as ROMs and RAMs, or A/D converters, and the like, and may include computer programs configured to execute flow rate control operations to be described later. The first control circuit 7 and the second control circuit 17 can be implemented by a combination of hardware and software.

In the flow rate control device 100, it is configured to control the flow rate of the fluid flowing to the downstream side of the flow rate control valve 8 by controlling the drive of the piezoelectric element 10b of the flow rate control valve 8, while the pressure control valve 6 is controlled so that the upstream pressure $P_1$ output from the first pressure sensor 3 becomes a set value by the first control circuit 7 and the second control circuit 17. The flow rate control device 100, in particular, is capable of performing flow control by utilizing the principle that when the critical expansion condition $P_1/P_2$ about 2 ($P_1$: the fluid pressure upstream side of the restriction part (upstream pressure), $P_2$: the fluid pressure downstream side of the restriction part (downstream pressure)) is satisfied, the flow rate of the gas passing through the restriction part 2 or the flow rate control valve 8 is determined by the upstream pressure $P_1$ regardless the downstream pressure $P_2$.

When the critical expansion condition is satisfied, the flow rate Q of the downstream side of the flow rate control valve 8 is given by $Q=K_1 \cdot Av \cdot P_1$ ($K_1$ is a constant depending on the type of fluid and the fluid temperature). The flow rate Q is considered to be approximately proportional to the upstream pressure $P_1$ and the valve opening Av of the flow rate control valve 8. When the second pressure sensor 4 is provided, the flow rate can be calculated even when the difference between the upstream pressure $P_1$ and the downstream-side pressure $P_2$ is small, and the above-mentioned critical expansion condition is not satisfied, on the basis of the upstream pressure $P_1$ and the downstream pressure $P_2$ measured by the pressure sensors, the flow rate Q can be calculated from a predetermined equation $Q=K_2 \cdot Av \cdot P_2^m (P_1-P_2)^n$ (where $K_2$ is a constant depending on the type of fluid and the fluid temperature, m and n are characteristics derived from the actual flow rate).

Figure 7:
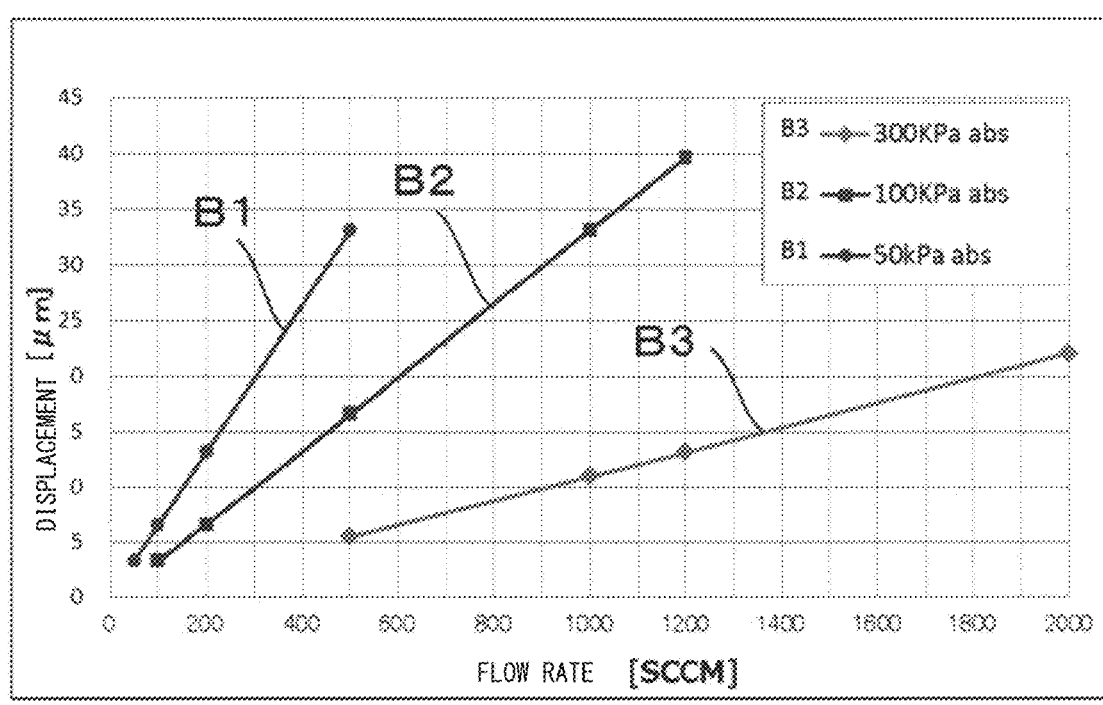
FIG. 7 is a diagram showing the relationship between the flow rate and the piezo displacement amount (strain sensor output) of the flow rate control valve, three graphs showing the relations at different upstream pressure P1.

FIG. 7 is a diagram showing the relationship between the flow rate and the piezo displacement amount in the flow rate control valve 8. However, FIG. 7 shows the case when the valve opening Av increases as the piezo displacement amount increases (corresponding to the normally closed type). As described above, in the flow rate control device 100 of the present embodiment, the piezo displacement amount (or valve opening Av) can be detected based on the strain sensor output.

In FIG. 7, graphs B1 to B3 when the upstream pressure $P_1$ is controlled to each of 50 kPa abs, 100 kPa abs, and 300 kPa abs by controlling the pressure control valve 6 on the basis of the output from the first pressure sensor 3. As shown in FIG. 7, while controlling the upstream pressure $P_1$ to a constant value corresponding to the desired flow rate range using the pressure control valve 6, by controlling the valve opening of the flow rate control valve 8 based on the strain sensor output (piezo displacement amount), it is possible to suitably control the flow rate over a wide range. In particular, when the flow rate control valve 8 is feedback-controlled on the basis of the strain sensor output, the responsiveness of the flow rate control can be improved, as compared with the case where the control valve is feedback-controlled on the basis of the upstream pressure $P_1$ as in the conventional art. Therefore, the flow rate control valve 8 in the present embodiment has a function of changing the opening when the distance between the valve seat and the valve element of the valve is considered as the opening, and can be used as the variable orifice (restriction part having a changeable opening).

Further, in the flow control device 100 of the present embodiment, the maximum set flow rate of the restriction part 2 with a fixed opening degree is set larger than the maximum set flow rate of the flow rate control valve 8 with a variable opening degree. Here, the maximum set flow rate of the restriction part 2 is the flow rate of the gas flowing through the restriction part 2 when the pressure upstream side of the restriction part 2 under a critical expansion condition in the flow rate control device 100 is considered as the maximum set pressure, the maximum set flow rate of the flow rate control valve 8 in the same condition means the flow rate of the gas flowing when the flow rate control valve 8 is opened at the maximum set opening degree. In this case, typically, the opening area of the restriction part 2 (i.e. the flow path cross-sectional area) is larger than the flow path cross-sectional area of the flow rate control valve 8 at the maximum set opening degree. The restriction part 2, for example, is constituted by an orifice plate with a maximum set flow rate of 2000 sccm (orifice diameter: about 300 μm), the control flow rate of the flow rate control valve 8 is set to 2000 sccm or less. In addition, the maximum set opening degree of the above-described flow rate control valve 8 means the largest opening degree within the range used for flow rate control, it is usually a smaller opening degree than the maximum opening degree when the flow rate control valve 8 is fully opened (no voltage applied).

By configuring as described above, by controlling the upstream pressure $P_1$ by the pressure control valve 6 using the restriction part 2 with a fixed opening degree as the main element of the flow rate control, it is possible to perform the flow rate control as same as the conventional pressure-type flow rate control device, it is also possible to control the gas flow rate by performing the opening adjustment of the flow rate control valve 8 while maintaining the upstream pressure $P_1$ constant by using the pressure control valve 6. Therefore, it is possible to perform flow rate control in various aspects, it is also possible to correspond to the pulse flow rate control.

In addition, the flow rate control using the restriction part 2 with a fixed opening degree as the main element of the flow rate control is suitable for a continuous flow rate control wherein the flow rate control is maintained at a set value for a relatively long period of time. On the other hand, the flow rate control wherein the flow rate is determined by the opening degree of the flow rate control valve 8 at a flow rate less than the maximum set flow rate of the restriction part 2 with a fixed opening degree, i.e., flow rate control such as using the flow rate control valve as a variable orifice (restriction part with variable opening degrees) is suitable for intermittent flow control (such as pulse flow rate control etc.).

Here, the control of the continuous flow broadly refers to the control of fluid when the flow of the fluid continues, it may also include cases such as when the fluid flowing at a flow rate of 100% changed to flowing at a flow rate of 50%. Further, when performing continuous flow rate control using the restriction part 2 with a fixed opening degree, it is preferable to fully open the flow rate control valve 8 (the maximum opening degree), or at least to maintain a larger opening than the opening degree of the restriction part 2 with a fixed opening degree.

Further, the control of the continuous flow is not limited to periodic opening and closing control at regular intervals such as pulse flow rate control, it also includes pulse opening and closing control performed irregularly, or opening and closing control when the pulse amplitude is not constant but fluctuates, and opening and closing control when the pulse width fluctuates.

FIGS. (a) and 8(b) show the upstream pressure $P_1$, the opening degree control signal and the flow rate output supplied to the flow rate control valve 8, when the pulse flow rate control is performed in the flow rate control device 100. FIG. 8(a) shows the case where the pulse flow rate control is performed at 2000 sccm, and FIG. 8(b) shows the case where the pulse flow rate control is performed at 200 sccm.

When the pulse flow rate control is performed as shown in FIG. 8(a), by using the pressure control valve 6 and the first pressure sensor 3, the upstream pressure $P_1$ is controlled so that the upstream pressure $P_1$ becomes a constant set value (here, 300 kPa). More specifically, by feedback control the pressure control valve 6 so that the difference between the measured value output by the pressure sensor 3 and the set value becomes 0, it is possible to maintain the upstream pressure $P_1$ at the set value.

Then, while maintaining the upstream pressure $P_1$ constant as described above, to control the opening of the flow rate control valve 8 by a pulse-shaped opening control signal. At this time, in the normally open type of the flow rate control valve 8, the maximum drive voltage is applied when it is in the closed state, and the minimum drive voltage is applied when it is in fully opened state. However, the minimum driving voltage to be applied need not be 0 volts, it may be a voltage corresponding to the opening degree though which gas can pass the flow rate control valve 8, and at a flow rate above the maximum set flow rate of the restriction part 2 having a fixed opening. Thus by performing the opening and closing operation of the flow rate control valve 8 in a pulsed manner, it is possible to perform the pulse flow rate control of the gas at the flow rate (here 2000 sccm) according to the maximum set flow rate of the restriction part 2 having a fixed opening.

Figure 8:
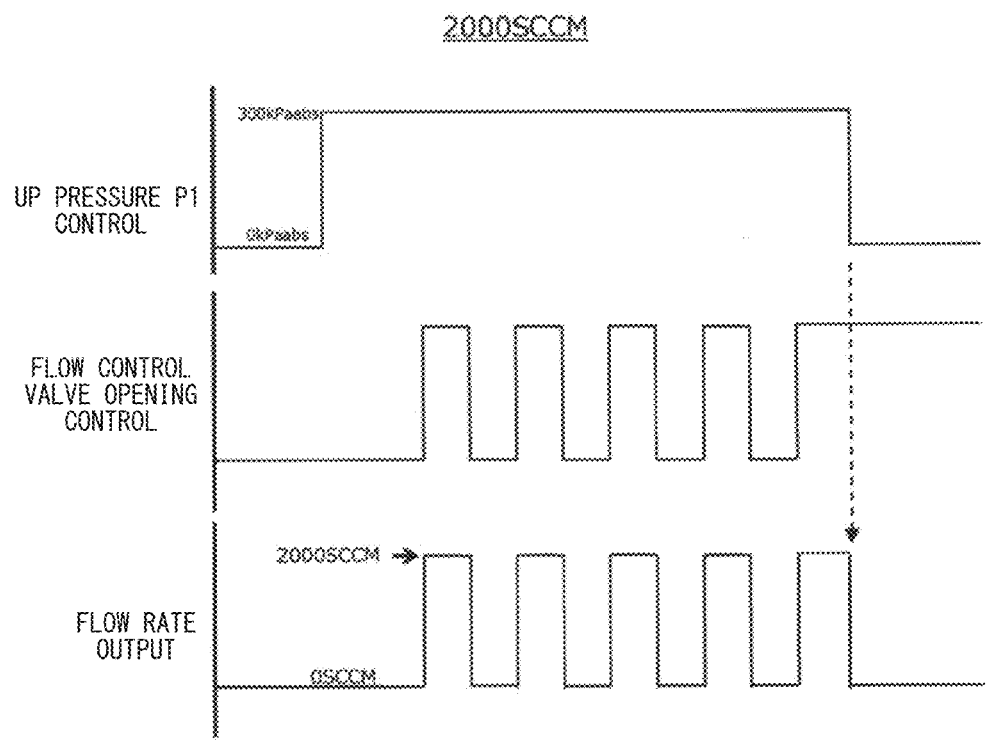
FIG. 8 are diagrams showing two aspects of pulse flow rate control, (a) shows the pulse flow rate control at a flow rate determined by the restriction part; (b) shows the pulse flow rate control at a flow rate determined by the opening of the flow rate control valve.
Figure 8:
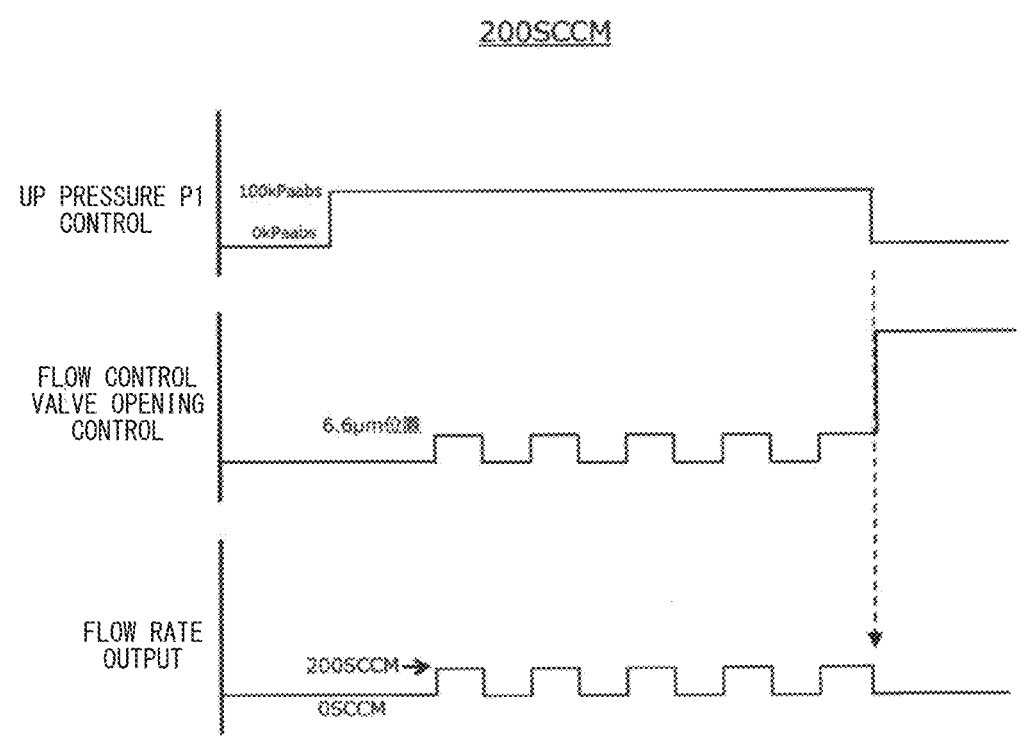

On the other hand, as shown in FIG. 8 (b), when performing the pulse flow rate control at a smaller flow rate, by using the pressure control valve 6 and the first pressure sensor 3, while performing the control of the upstream pressure $P_1$ so as to be maintained at a smaller constant set value (here 100 kPa), to pulse control the opening and closing operation of the flow rate control valve 8 at a set opening degree smaller than the restriction part 2 with a fixed opening degree. Therefore, it is possible to perform a pulsed gas supply at a flow rate corresponding to the set opening degree of the flow rate control valve 8 which is a restriction part having variable opening degrees.

At this time, by controlling the driving voltage of the piezo actuator based on the output of the strain sensor, it is possible to accurately control the opening of the flow rate control valve 8. More specifically, while detecting the elongation amount of the actual piezo actuator based on the output of the strain sensor, by feedback control the applied drive voltage to the piezo actuator so as the detected elongation amount coincide with the elongation amount corresponding to the desired flow rate (at 6.6 μm position in the embodiment shown in FIG. 8), it is possible to control the flow rate control valve 8 to the opening corresponding to the desired flow rate.

After the pulsed flow rate control is performed as described above, the upstream pressure $P_1$ can be reduced by closing the pressure control valve 6, and the flow rate can be reduced to 0 by reducing the upstream pressure $P_1$ to 0 KPa as shown in FIGS. 8(a) and 8(b), for example. At this time, the flow rate control valve 8 may be maintained at, for example, the opening at the minimum drive voltage corresponding to the above maximum set opening, i.e., the origin position of the opening control.

As described above, according to the flow rate control device 100 of the present embodiment, it is possible to perform flow rate control with improved responsiveness that can be applied to pulse flow rate control or the like. In the pulse flow rate control, based on the output of the strain sensor, it is possible to repeat the opening and closing of the flow control valve 8 at an accurate opening degree, thus enable pulse supply of the fluid with improved flow rate accuracy.

Further, it is possible to monitor the elongation amount of the piezoelectric element 10b using the strain sensor 20, when a tendency of abnormality is observed, such as, when the elongation amount in the fully closed state is below the previously-set threshold, or when the elongation amount does not reach the expected value even though the drive voltage to the piezo actuator is supplied, it can be determined that an abnormality occurs in the piezo actuator (reached the use limit). This allows the piezo actuator to be replaced before it fails completely, eliminating the use of a defective valve.

Hereinafter, a modification of the flow rate control device according to the present embodiment will be described.

Figure 9:
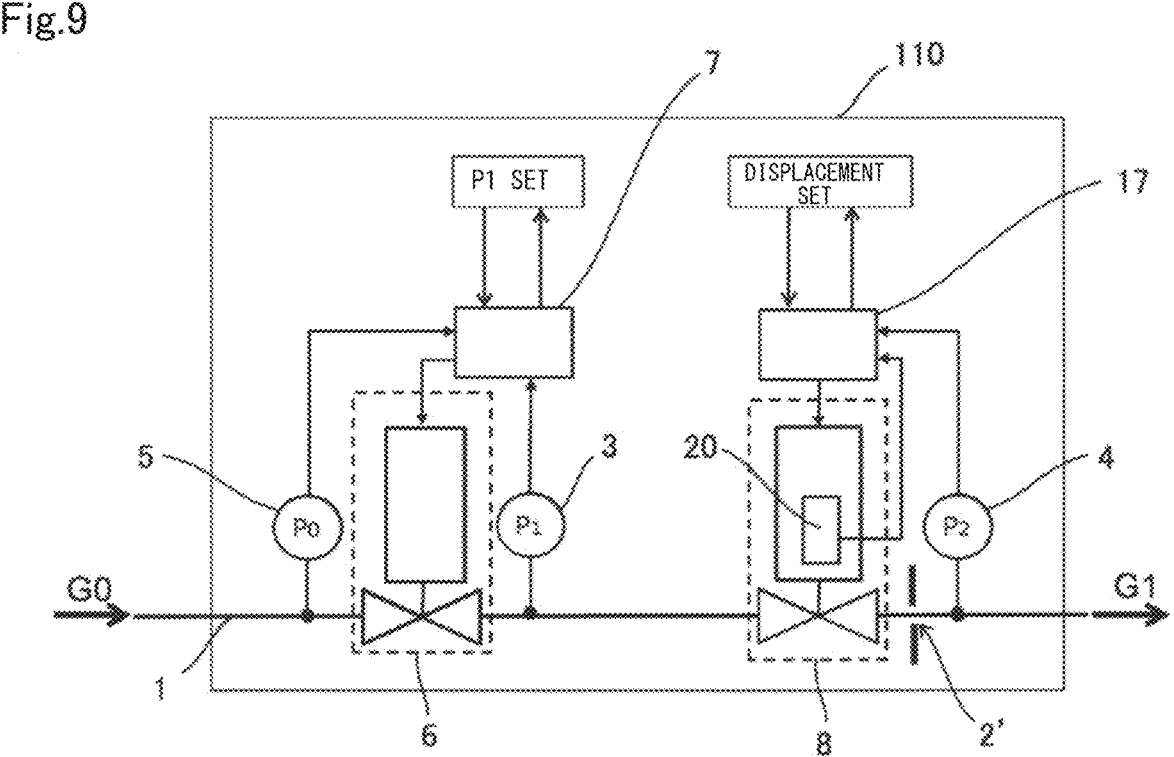
FIG. 9 is a schematic diagram showing a configuration of a flow rate control device according to a modification of the embodiment of the present invention.

FIG. 9 shows a configuration of a flow rate control device 110 according to a first modification. The flow rate control device 110 is different from the flow rate control device 100 shown in FIG. 1, since the restriction part 2' having a fixed opening degree is provided downstream side of the flow rate control valve 8.

Also in the flow rate control device 110, by controlling the drive voltage of the flow rate control valve 8 based on the output of the strain sensor 20, it is possible to perform the pulse opening and closing operation of the flow rate control valve 8 at an accurate opening degree, and it is possible to perform the pulse flow rate control at a desired flow rate. It is also possible to perform the flow rate control using the restriction part 2' having a fixed opening degree.

Figure 10:
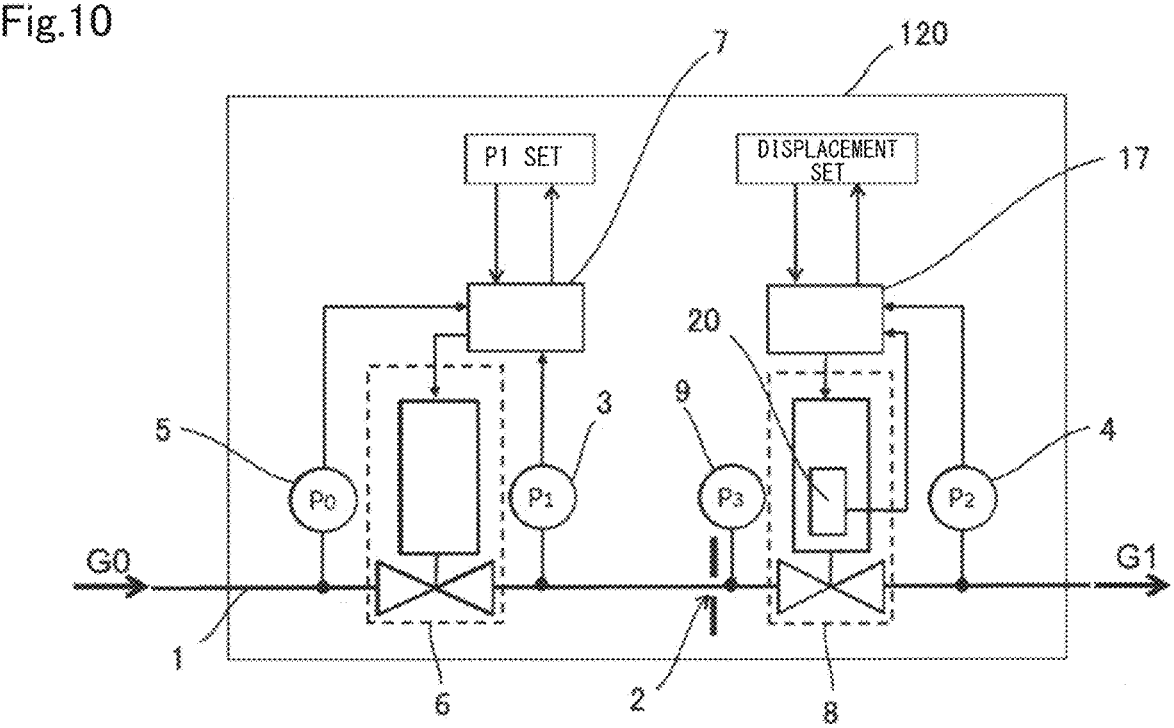
FIG. 10 is a schematic diagram showing a configuration of a flow rate control device according to another modification according to the embodiment of the present invention.

FIG. 10 shows a configuration of a flow rate control device 120 according to a second modification. The flow rate control device 120 is different from the flow rate control device 100 shown in FIG. 1, since a third pressure sensor 9 is further provided between restriction part 2 having a fixed opening degree and the flow rate control valve 8.

Using the third pressure sensor 9, it is possible to measure the pressure between the restriction part 2 and the flow rate control valve 8, thus enable more accurate flow control. For example, in the above, when performing flow rate control by adjusting the opening degree of the flow rate control valve 8, the calculated flow rate is obtained on the basis of the upstream pressure $P_1$ detected by the first pressure sensor 3 and the opening of the flow rate control valve 8, however, the calculated flow rate may also be obtained on the basis of a pressure $P_3$ detected by the third pressure sensor 9 and the opening degree Av of the flow rate control valve 8. In this manner, there is a possibility that more accurate calculated flow rate can be obtained.

Further, as another modification, as shown in FIG. 9, the restriction part 2' having a fixed opening is provided downstream side of the flow rate control valve 8, and a third pressure sensor for measuring the pressure between the flow rate control valve 8 and the restriction part 2' may also be provided.

Figure 11:
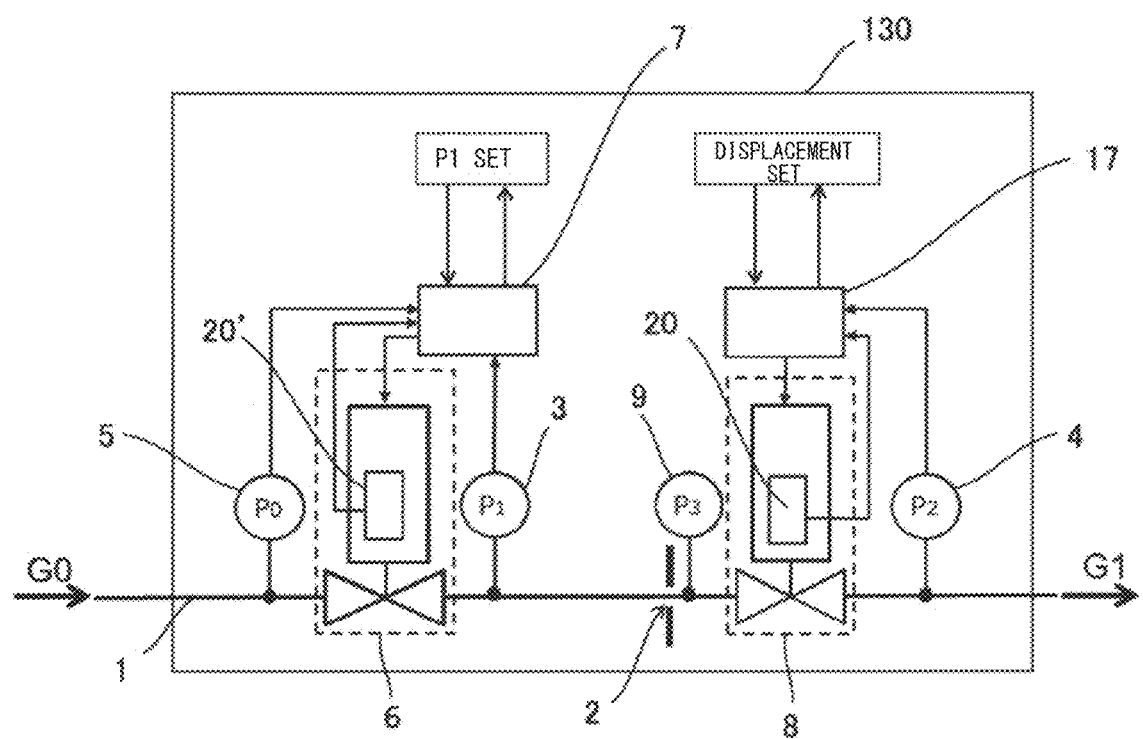
FIG. 11 is a schematic diagram showing a configuration of a flow rate control device according to still another modification according to the embodiment of the present invention.

Furthermore, as in a flow rate control device 130 of the third modification shown in FIG. 11, not only the flow rate control valve 8, but a strain sensor 20' may also be provided in the pressure control valve 6. The strain sensor 20' is, for example, used to detect characteristic changes or abnormal operation of the piezo actuator constituting the pressure control valve 6. By monitoring the extension amount of the piezoelectric element on the basis of the output of the strain sensor 20', it is possible to perform preventive maintenance of abnormality occurrence of the pressure control valve 6.

While embodiments of the present invention have been described above, various modifications are possible. For example, in such a case where the relationship between the strain gauge output and the displacement of the piezo actuator is not linear, a conversion table between the strain gauge output and the displacement of the piezo actuator may be prepared in advance. The conversion table is stored in advance in, such as a storage device provided in the control circuit, and when the displacement of the piezoelectric actuator is detected, the read conversion table can be used to more accurately know the valve opening degree from the strain gauge output.

Further, in the flow control device according to an embodiment of the present invention, the flow rate control valve may be a piezoelectric element driven valve of the normally closed type, in this case, by controlling the drive voltage of the flow rate control valve on the basis of the strain sensor output, it is possible to perform the flow rate control with good accuracy and responsiveness.

Further, when using an orifice plate as the restriction part 2 having a fixed opening, the above-described flow rate control valve 8 and the orifice plate may be provided integrally in the embodiment as a known orifice built-in valve. When provided as an orifice built-in valve, the orifice plate and the valve seat body are disposed in the hole for mounting the flow rate control valve 8, a valve main body (including a valve element and an actuator) of the flow rate control valve 8 is fixed above the valve seat body. In this way, since the orifice plate and the valve element of the flow rate control valve 8 are closely disposed, it is possible to reduce the volume between them, so as to enable the improvement of the responsiveness of the flow rate control. Also, in this case, the flow rate control valve 8 as described above may functions as a restriction part having variable opening degrees in a pressure type flow rate control device.

INDUSTRIAL APPLICABILITY

The flow rate control device according to the embodiments of the present invention can be suitably used even when high-speed responsiveness of flow rate control is required in a semiconductor manufacturing process.

DESCRIPTION OF NUMERICALS

1 Flow path
2 Restriction part
3 First pressure sensor
4 Second pressure sensor
5 Inflow pressure sensor
6 Pressure control valve
7 First control circuit
8 Flow rate control valve
9 Third pressure sensor
10 Piezo actuator
17 Second control circuit
20 Strain sensor
20z first strain gauge
20x second strain gauge
100, 110, 120, 130 Flow rate control device

The invention claimed is:

1. A flow rate control device comprising:
   a pressure control valve provided in a flow path;
   a flow rate control valve provided downstream of the pressure control valve;
   a first pressure sensor for measuring a pressure downstream of the pressure control valve and upstream of the flow rate control valve; and
   a restriction part having a fixed opening degree;

wherein the flow rate control valve includes a valve element capable of coming in and out of contact with a valve seat, a piezoelectric element for moving the valve element to come in and out of contact with the valve seat, and a strain sensor provided on a side surface of the piezoelectric element, the flow rate control valve is used as a restriction part capable of changing an opening degree, the opening degree being defined by a distance between the valve seat and the valve element of the flow rate control valve, a driving of the piezoelectric element is controlled based on a signal output from the strain sensor while the pressure control valve is controlled based on a signal output from the first pressure sensor, and when performing continuous flow control, flow rate is controlled by using the restriction part having the fixed opening degree; and when performing intermittent flow rate control, flow rate is controlled by using the flow rate control valve as the restriction part capable of changing the opening degree.

2. The flow rate control device according to claim 1, wherein the flow rate control valve is fully opened when the continuous flow control is performed using the restriction part having the fixed opening degree.

3. The flow rate control device according to claim 1, wherein the restriction part having the fixed opening degree is provided upstream side of the flow rate control valve.

4. The flow rate control device according to claim 3 further comprising a second pressure sensor for measuring a pressure downstream side of the flow rate control valve.

5. The flow rate control device according to claim 1, wherein the restriction part having the fixed opening degree is provided downstream side of the flow rate control valve.

6. The flow rate control device according to claim 5, further comprising a second pressure sensor for measuring a pressure of the downstream side of the restriction part having the fixed opening degree.

7. The flow rate control device according to claim 1, further comprising a third pressure sensor for measuring a pressure between the flow rate control valve and the restriction part having the fixed opening degree.

8. The flow rate control device according to claim 1, wherein the maximum set flow rate of the restriction part having the fixed opening degree is greater than the maximum set flow rate of the flow rate control valve.

9. The flow rate control device according to claim 1, wherein a flow rate control is performed in a state that a pressure upstream the flow rate control valve and a pressure downstream the flow rate control valve satisfy a critical expansion condition.

10. The flow rate control device according to claim 1, wherein the strain sensor includes a first strain gauge for detecting a strain in a expansion direction of the piezoelectric element, and a second strain gauge for detecting a strain in a direction perpendicular to the expansion direction of the piezoelectric element.

11. The flow rate control device according to claim 1, wherein the flow rate control valve is provided with a piezo actuator having a plurality of piezoelectric elements containing the piezoelectric element whereto the strain sensor is attached, and a cylindrical body for accommodating the plurality of piezoelectric elements in a row, and is a normally open type valve configured to move a metal diaphragm valve element that is used as the valve element in a direction towards the valve seat, by applying a voltage to the piezo actuator.

12. The flow rate control device according claim 1, wherein the flow rate control valve includes the piezo actuator having a piezoelectric element whereto he strain sensor is attached, and a cylindrical body for accommodating the piezoelectric element, and is a normally open type valve configured to move the metal diaphragm valve element that is used as the valve element in a direction towards the valve seat, by applying a voltage to the piezo actuator.

\* \* \* \* \*